United States Patent [19]

Benning

[11] Patent Number: 4,645,008
[45] Date of Patent: Feb. 24, 1987

[54] RACING-TYPE HORSESHOE

[76] Inventor: James M. Benning, 1857 Tilton Dr., Pittsburgh, Pa. 15241

[21] Appl. No.: 735,523

[22] Filed: May 20, 1985

[51] Int. Cl.⁴ ............................................. A01L 1/04
[52] U.S. Cl. .......................................... 168/11; 168/13
[58] Field of Search ..................... 168/11, 12, 13, 14, 168/26, 28

[56] References Cited

U.S. PATENT DOCUMENTS

| | | | |
|---|---|---|---|
| 188,620 | 3/1877 | Going | 168/12 |
| 508,607 | 11/1893 | Edge | 168/12 X |
| 602,046 | 4/1898 | Hitch | 168/11 |
| 690,984 | 1/1902 | Myers | 168/14 |
| 2,622,685 | 12/1952 | Dixon | 168/13 |
| 4,122,900 | 10/1978 | Barr et al. | 168/12 |

Primary Examiner—Robert P. Swiatek

[57] ABSTRACT

A racing-type horseshoe having a metal shoe plate for nailing to a horse's hoof and a ground contacting base plate adapted for affixation to the sole plate by threaded fasteners which permit quick and easy replacement of the base plate.

5 Claims, 4 Drawing Figures

U.S. Patent  Feb. 24, 1987  4,645,008
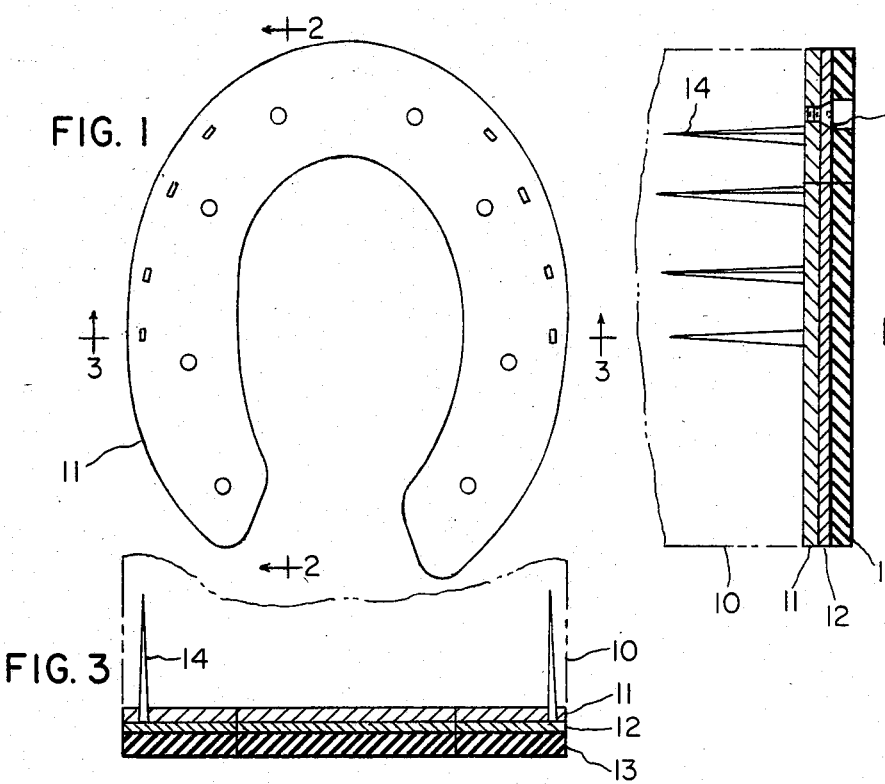
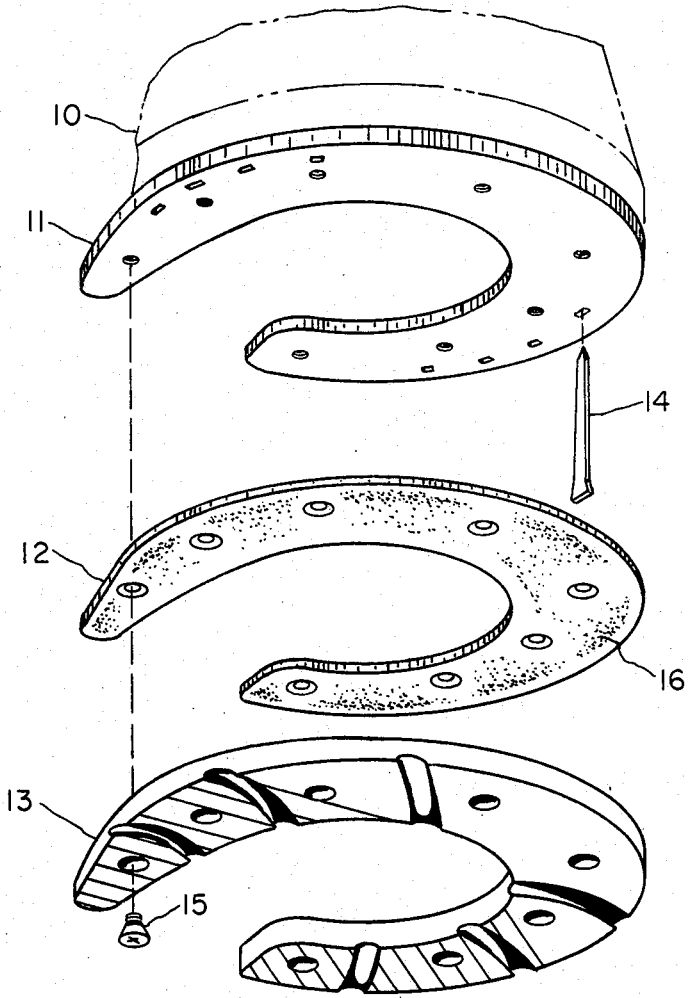

RACING-TYPE HORSESHOE

BACKGROUND OF THE DISCLOSURE

The present invention relates generally to the field of racing horseshoes, and more particularly to a type of horseshoe which will absorb most impact shock, significantly improve footing, allow for fine balance adjustments, while permitting the ground contact surface to be changed without the service of a blacksmith.

Prior workers in the art of horseshoes have expended much effort trying to find a horseshoe for competition horses that would provide for sure footing on wet, dry, deep or hard racing surfaces. The addition of a swedge groove or various calks and grabs to the shoe have reduced the amount of slipping, but these modifications can have serious side effects. The competition horse will often experience ankle and knee soreness as well as tendon and ligament injuries. These conditions of lameness are a result of the unnatural pull forces that are generated by these traction devices while the horse is jogging, training or racing.

Another area that has received much attention is the development of a horseshoe that will absorb the tremendous impact forces realized by the horse's legs while engaged in competition or while training so as to be fit for competition. This effort is well demonstrated in U.S. Pat. Nos. 3,490,536 and 3,907,036. Although each of the shoes disclosed in these two patents would aid in reducing impact forces, neither shoe would permit changing of the ground contact surface, without adding additional nail or screw holes to the horse's hoof wall. Thus, each new hole added to the horse's hoof would further weaken the hoof wall and often lead to quarter cracks in the hoof and subsequent lameness.

SUMMARY OF THE INVENTION

The present invention relates generally to the field of racing type horseshoes and, more particularly, to a multiple piece horseshoe assembly which will permit numerous adjustments to be made to any of the horse's hooves, with no adverse effect to any hoof wall. This present invention will alleviate almost all of the restrictions now realized by horse trainers, while using the latest state of the art in horseshoes. This invention consists of two primary plates, an upper plate and a lower plate that is really a combination plate. The upper plate or sole plate is attached to the horse's hoof in the conventional manner. The blacksmith will trim the horse's hoof to obtain the desired toe length, then file the hoof to the desired degree or angle of slope required for that particular hoof. The sole plate is then affixed to the horse's hoof by using a modified horseshoe nail that will enable the nail head to be countersunk into the sole plate.

This sole plate will be made of a ferrous or non-ferrous metal. This plate will have a plurality of threaded holes as well as acceptance holes for the horseshoe nails. The blacksmith will not be permitted to pinch or bend the sole plate to obtain the desired fit on the hoof. This assembly is produced in a complete sizing order and distortion of this sole plate will destroy the primary objective of the quick change capability of the horseshoe assembly. The blacksmith will choose the size sole plate that fits the hoof or the next larger size sole plate. Any overhang of metal will easily be removed by a rasp or file. The lower plate or ground contact plate will then be attached to the sole plate by the use of threaded fasteners.

As previously stated, the lower plate is a combination plate. This plate is a ferrous or non-ferrous plate that has had an elastomeric material bonded to it. A structural adhesive can be used to bond the rubber to the metal. The rubber material will always be the ground contact surface of this horseshoe assembly. The threaded fasteners that are used to attach the lower plate to the upper plate will be countersunk into the rubber, so as not to make contact with the ground at any time. The use of this rubber as a ground contact surface will aid in absorbing almost all of the impact shock that would have previously had a deteriorating effect on all of the leg joints and tendons. This rubber ground contact surface will always have a tread design that will give the competition horse the best footing for the race course that is being used by that horse on that day. The stride of any horse can be improved by increasing or decreasing the traction available from this ground contact surface. With the trainer having the ability to change this ground contact plate, the horse can be assured of sure footing on any racing surface and should perform with confidence as well as to its utmost ability. This invention will give the trainer a tremendous latitude to choose the best ground contact surface for any hoof at anytime. Prior to this invention, the horse was limited to the same ground contact surface for jogging, training and racing, unless a blacksmith was appointed to change the horseshoes. It must be remembered that prior to this invention, a limited number of shoe changes would be available to the trainer in any thirty day period. Each shoe change would require adding new holes to the hoof wall and further weaken the integrity of that hoof. With the present invention, hundreds of changes are available to the trainer with no detrimental effect to the horse.

The objective of this present invention is to make available to performance horse trainers a horseshoe that will permit the changing of the cushioned ground contact surface in a matter of minutes while using conventional tools. This horseshoe will allow the trainer to adjust the horse's footing for environmental changes to the race course. This horseshoe will absorb almost all of the impact shock to the hoof and leg while assuring the horse firm footing and eliminating slipping that so often ends a racing career.

Further scope of applicability of the present invention to other areas will become apparent from the detailed description to follow taken in conjunction with the accompanying drawings.

BRIEF DESCRIPTION OF THE DRAWING

FIG. 1 is a top plan view of the quick-change horseshoe in accordance with the present invention.

FIG. 2 is a cross-sectional view taken along line 2—2 in FIG. 1.

FIG. 3 is a cross-sectional view taken along line 3—3 in FIG. 1.

FIG. 4 is an exploded view of the quick-change horseshoe of FIG. 1.

DETAILED DESCRIPTION OF THE PREFERRED EMBODIMENT

All reference in the following description of the quick-change horseshoes are intended to refer to the specific model of my invention chosen for the drawing and are not intended to limit the scope of my invention.

In FIG. 1 of the drawing, I show a top view of the quick-change horseshoe; from this perspective only the sole plate or upper plate 11 is visible. In FIG. 2 the components of my invention become more distinguishable. The horse's hoof 10 is shown in phantom and the sole plate 11 is affixed to the hoof 10 by use of modified horseshoe nails 14 with the heads of the nails countersunk into the sole plate 11. The lower plate 12 or quick-change portion of the shoe is shown with threaded fasteners 15 securing the lower plate 12 to the sole plate 11 in FIG. 4. I show all of the components of the quick-change horseshoe in a specific order of assembly. As previously stated regarding FIG. 2, the sole plate 11 is affixed the the hoof 10 (in phantom) by the modified horseshoe nail 14.

The drawing shows a ground contact plate 13 of elastomeric rubber of suitable quality with a very high tear and peel resistance. This ground contact plate 13 is preferably affixed to the lower plate, or quick-change plate 12, by a structural adhesive 18.

Horseshoes of the invention are produced in graduated sizes to fit a variety of hoof sizes to avoid the need for a blacksmith to pinch or bend the sole plate 11 so as to achieve a fit to a horse's hoof. Any pinching or bending of the sole plate 11 would interfere with matching the screw holes in the sole plate and base plate and this would interfere with interchangeability or quick change of plates 12 in accordance with this invention.

While the invention has been described in terms of preferred embodiments, the claims appended hereto are intended to encompass all embodiments which fall within the spirit of the invention.

What is claimed is:

1. A horseshoe comprising a substantially flat metal sole plate affixed to a horse's hoof in contact with the hoof without pinching or bending said plate to fit it to the hoof and without unusual modification of the hoof, a cushioned base plate attached to said sole plate for ground contacting purposes with said base plate comprising a substantially flat metal support plate attached to said sole plate in metal-to-metal contact and substantially coextensive therewith and an elastomeric ground plate bonded to said support plate, said sole plate and said ground plate having holes in them and said base plate having matching countersunk holes in it, and a plurality of threaded means for attaching said base plate to said sole plate by passing the threaded means through said holes in said plates after the sole plate is affixed to a horse's hoof and for quickly and easily removing and replacing said base plate with any of a variety of alternative base plates, said attachment of the base plate to the sole plate being entirely by securement of said support plate to said sole plate with said threaded means and with the bottom end of said threaded means disposed substantially no lower than the bottom surface of said metal support plate to minimize deleterious effects on said threaded means or on the connection of the base plate to the sole plate during use of the horseshoe on a horse's hoof.

2. A horseshoe as set forth in claim 1 in which said sole plate has a plurality of countersunk holes for receiving nails for securement of said sole plate to a horse's hoof with the top of each nail head extending no more than flush with the bottom surface of said sole plate.

3. A horseshoe as set forth in claim 1 in which said sole plate is made of aluminum alloy.

4. A horseshoe kit comprising at least one substantially flat metal sole plate adapted to be nailed to a horse's hoof in direct contact with the hoof without bending or pinching of the sole plate and without unusual modification of the hoof, a cushioned base plate adapted for attachment to said sole plate for ground contacting purposes, said base plate comprising a substantially flat metal support plate for securement to said sole plate in metal-to-metal interfacial contact and substantially coextensive therewith and an elastomeric ground contact plate bonded to said support plate, said sole plate having tapped holes in it, said ground plate having holes in it, and said metal support plate having matching countersunk holes in it, and a plurality of headed threaded means for attaching said base plate to said sole plate by passing said threaded means through said holes in said plates after the sole plate is affixed to a horse's hoof and for quickly and easily changing base plates while said sole plate is affixed to a horse's hoof, said attachment of the base plate to the sole plate being entirely by securement of said support plate to said sole plate with said threaded means and with the heads of said threaded means disposed in the countersunk holes in the bottom surface of said metal support plate to minimize deleterious effects on said threaded means or on the connection of the base plate to the sole plate during use of the horseshoe on a horse's hoof.

5. A kit as set forth in claim 4 in which said sole plate is made of aluminum alloy.

* * * * *